United States Patent
Werner

(10) Patent No.: US 7,685,205 B2
(45) Date of Patent: Mar. 23, 2010

(54) APPLICATION MANAGEMENT SYSTEM AND METHOD FOR MANAGING AN APPLICATION

(75) Inventor: Horst Werner, Rettigheim (DE)

(73) Assignee: SAP AG, Walldorf (DE)

( * ) Notice: Subject to any disclaimer, the term of this patent is extended or adjusted under 35 U.S.C. 154(b) by 976 days.

(21) Appl. No.: 11/048,701

(22) Filed: Feb. 3, 2005

(65) Prior Publication Data

US 2005/0198038 A1  Sep. 8, 2005

(30) Foreign Application Priority Data

Feb. 3, 2004  (EP) ................... 04075322

(51) Int. Cl.
G06F 7/00  (2006.01)
G06F 17/30  (2006.01)

(52) U.S. Cl. .................. 707/781; 715/741

(58) Field of Classification Search ............... None
See application file for complete search history.

(56) References Cited

U.S. PATENT DOCUMENTS

| | | | |
|---|---|---|---|
| 6,400,996 B1 * | 6/2002 | Hoffberg et al. | 700/83 |
| 6,418,424 B1 * | 7/2002 | Hoffberg et al. | 706/21 |
| 6,553,375 B1 * | 4/2003 | Huang et al. | 707/10 |
| 6,640,145 B2 * | 10/2003 | Hoffberg et al. | 700/83 |
| 7,006,881 B1 * | 2/2006 | Hoffberg et al. | 700/83 |
| 7,305,392 B1 * | 12/2007 | Abrams et al. | 707/9 |
| 2003/0018616 A1 * | 1/2003 | Wilbanks et al. | 707/2 |
| 2003/0158855 A1 * | 8/2003 | Farnham et al. | 707/102 |
| 2004/0254938 A1 * | 12/2004 | Marcjan et al. | 707/100 |
| 2005/0050199 A1 * | 3/2005 | Mital et al. | 709/226 |

* cited by examiner

*Primary Examiner*—Khanh B Pham
*Assistant Examiner*—Azam Cheema
(74) *Attorney, Agent, or Firm*—Finnegan, Henderson, Farabow, Garrett & Dunner, LLP

(57) ABSTRACT

An application management system includes an application manager for managing an application and associated with a database resource storing a plurality of entities. The application manager includes an input for receiving an input defining an event in which a user is involved in the application or an input defining an event involving a manipulation of at least one entity in the database resource. A context is associated with the event and is represented by a set of references to the entities stored in the database resource. The application manager includes a situation representation manager for determining a situation representation that defines a subcontext. The situation representation manager identifies a subset of references to a plurality of entities that are relevant to the event. The application manager adapts the behavior of the application to a situation or a future situation on the basis of the situation representation.

29 Claims, 3 Drawing Sheets

APPLICATION MANAGEMENT SYSTEM AND METHOD FOR MANAGING AN APPLICATION

This application is based upon and claims the benefit of priority from prior patent application EP 04075322.0, filed Feb. 3, 2004, the entire contents of which are expressly incorporated herein by reference.

BACKGROUND

I. Technical Field

The present invention relates to an application management system and a method of managing an application.

II. Background Information

Applications such as business applications frequently allow the user to work in different contexts. These applications adapt information that is displayed and the actions or objects that the user may select according to a respective context. However, contexts are not explicitly modeled, and are instead implicitly given by the various screens of an application's user interface. Limited context information is kept when the user switches to another screen. While some applications use lists of recently or frequently used objects, the relationship of these objects with respect to the user's activities is unknown to the application.

Therefore, one problem with conventional applications is that the context information is poor and unavailable for generic algorithms. Instead, the context sensitivity has to be hard coded for each screen. The present invention addresses the problems encountered with conventional applications and improves the sensitivity of the context representation in the application.

SUMMARY

Consistent with the present invention, an application management system is provided. The system comprises a database resource for storing a plurality of entities associated with an application; and an application manager for managing the application. The application manager includes an input channel for receiving an input defining an event in which a user is involved in the application or an input defining an event involving a manipulation of at least one entity in the database resource. A context is associated with the event and is represented in the event by a set of references to a plurality of the entities stored in the database resource. The application manager also includes a situation representation manager for determining a situation representation in terms of a subset of the set of references to the plurality of entities to define a subcontext. The situation representation manager is arranged to identify the subset of the references to the plurality of entities which are relevant to the event. The application manager adapts a behavior of the application to a situation or a future situation on the basis of the situation representation.

Also consistent with the present invention, a method of managing an application is provided. The method comprises storing a plurality of entities associated with an application in a database resource; receiving an input defining an event in which a user is involved in the application or an input defining an event involving a manipulation of at least one entity in the database resource, wherein a context is associated with the event and is represented in the event by a set of references to a plurality of the entities stored in the database resource; determining a situation representation in terms of a subset of the references to the plurality of entities to define a subcontext, wherein the subset of the references to the plurality of entities which are relevant to the event are identified; and adapting the behavior of the application to a situation or a future situation on the basis of the situation representation.

BRIEF DESCRIPTION OF THE DRAWINGS

The accompanying drawings, which are incorporated in and constitute a part of this disclosure, illustrate various embodiments and aspects consistent with the present invention. In the drawings.

DETAILED DESCRIPTION

Figure 1:
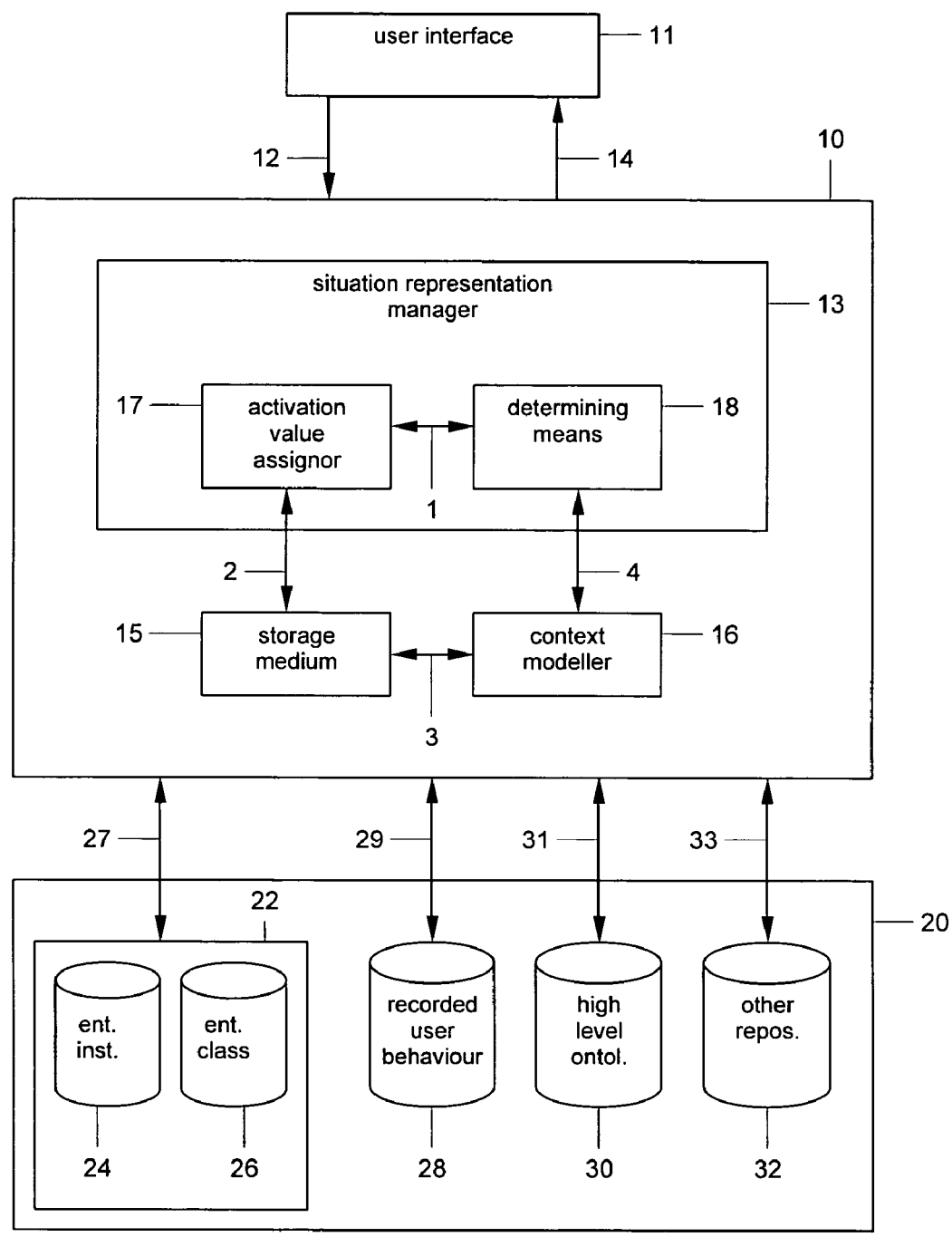
FIG. 1 shows an architecture that incorporates an embodiment of the present invention.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering or adding steps to the disclosed methods. Accordingly, the following detailed description does not limit the invention. Instead, the proper scope of the invention is defined by the appended claims.

Figure 2:
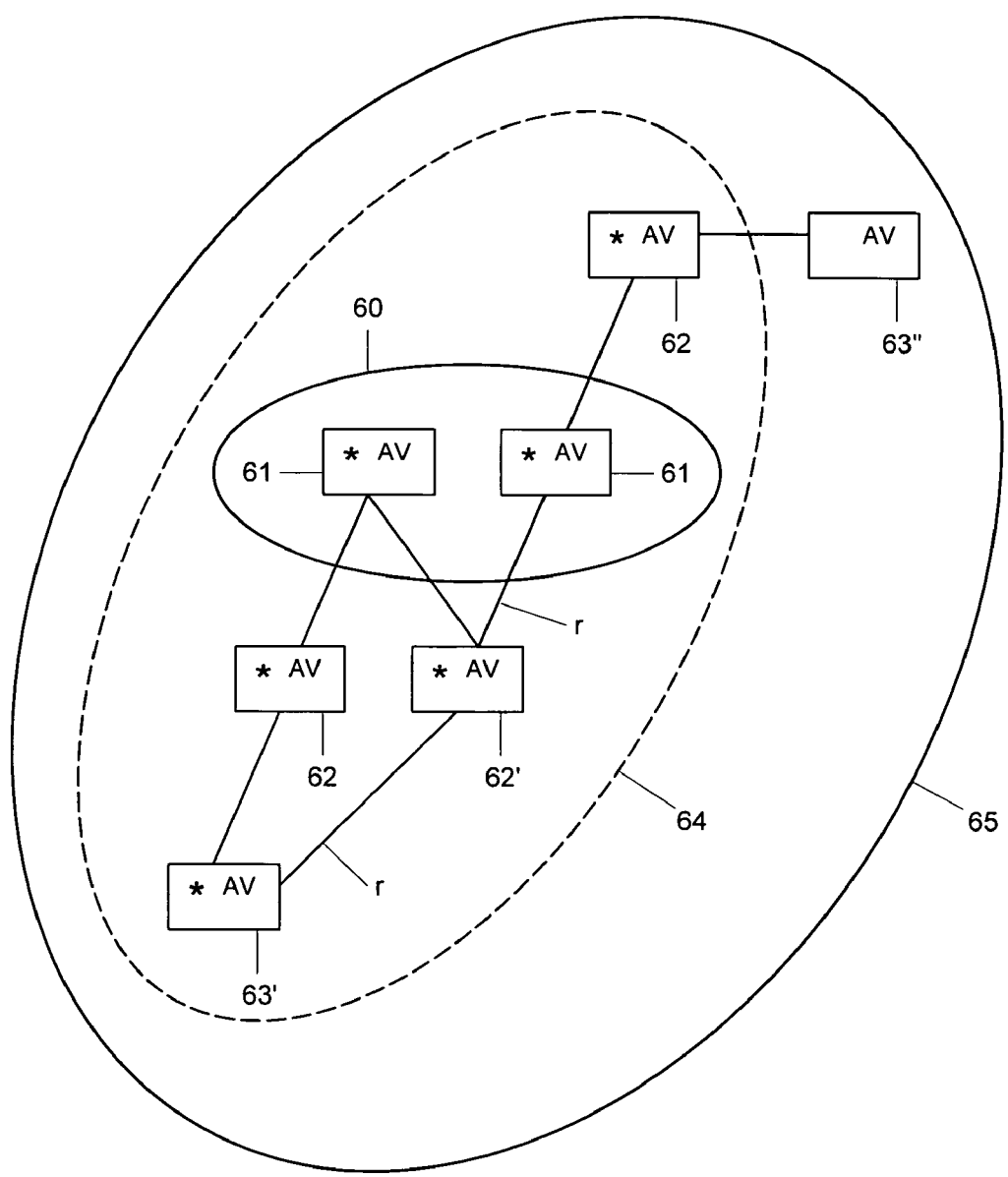
FIG. 2 shows a situation representation determined in accordance with an embodiment of the present invention.

FIG. 1 shows an architecture incorporating an embodiment of the present invention. FIG. 2 shows a situation representation determined in accordance with an embodiment of the present invention. With reference to FIGS. 1 and 2, an application management system is shown on which the process described hereinafter may be implemented. In particular, the data flow and data processing steps initiated by the system of an embodiment of the present invention are shown. The application management system comprises an application manager 10 for managing an application 20.

Application manager 10 is associated with a database resource 22 for storing a plurality of entities 61-63 associated with application 20. Application manager 10 includes an input channel 12 for receiving an input defining an event 60 in which a user is involved in application 20 or an input defining an event 60 involving a manipulation of at least one entity in the database resource 22. A context 65 is associated with the event 60 and is represented by a set of references to a plurality of the entities 61, 62, 63', 63" stored in the database resource 22. The application manager 10 further includes a situation representation manager 13 for determining a situation representation 64 in terms of a subset of the references to the plurality of entities 62, 62, 63' to define a subcontext 64. Situation representation manager 13 is arranged to identify the subset of the references to the plurality of entities 62, 62, 63' which are relevant to the event 60. The application manager 13 is arranged to adapt the behavior of the application 20 to the situation or a future situation on the basis of the situation representation 64.

Situation representation manager 13 may be associated via a data link 4 with a context modeler 16 and a storage medium 15 in which the situation representations are stored. By storing the situation representations, they are made available for the application to learn from the past situation in a dynamic way to improve context sensitive behavior. Because, the situation representation manager determines a subcontext, the volume of data to be handled in future situations is kept to a minimum while ensuring that the most relevant data is identified and stored. The application manager 10 may typically be associated with a user interface 11 with which a user interacts. The application manager may further exchange data 27, 29, 31, and 33 with the various components of the application 20. Further, the situation representation manager is arranged to exchange data 2, 4 with the storage medium 15 and the context modeler 16, respectively.

Typically, at any one time the user is involved in an event 60 that may include an action, a process, or both an action and a process. The application manager 10 is also associated with an application 20, which may include a database 22. The application may be a business application. If an application is to learn from past situations in a dynamic way to improve context sensitive behavior, these situations are preferably stored in a storage medium 15. If a dynamic context model is used by a context modeler 16, situation 60 can be defined as a subset 64 of the context 65. That is, as a set of entities 61, 62, 63' that are all contained by the current context model 65. One solution may be to store the entire context 65 as a situation representation. However, situation 64 may be diluted with entities that are not relevant to the event. The present invention provides a solution wherein dilution of the situation representation with irrelevant entities is avoided while minimizing the repository and processing requirements for the data constituting the situation representations, where it is desirable to store and process the situation representations.

The situation representation 64 is determined by the application manager 10 on the basis of data from the application 20 and the input 12. Depending on the circumstances, may also be determined with the current context representation which may be stored in the context modeler 16. Data may be exchanged 12,14 between the user interface 11 and the application manager 10. The context modeler 16 determines which entities 61 form a context representation on the basis of, among other things, the output of the situation representation manager 13. The context representation typically includes at least one entity 61. The context of an entity or an event as defined by the process or action is a collection of facts and entities 61 that are of special importance for that entity or event and which usually have a direct or indirect relationship to the entity or event.

Within a business application, such as a business application in which a database is provided, a context may be defined for a variety of entities 61 or a event 60 including, but not limited to a user, a session or a business entity. For a user the context may include entities 61 including his role, projects, personal preferences, etc. For a session the context may include entities 61 including a user, last actions, manipulated business entities 61, etc. For a certain business object of the business application, the context may include entities 61 including past projects, orders for a customer, etc. A business object is typically an entity 61 stored in a database 22. Technically, context may be represented by a number of instances of business entities 61, processes/actions, or events. An event 60 may be defined by at least one or a process or action.

The context modeler 16 models the context in response to the situation using situation representations stored in storage medium 15. According to the present invention, representations of a situation in which the user has been involved are stored in the storage medium 15. They may be stored in terms of the entities 61 involved or associated with each particular process and/or action as a frames. The current and previous situations may be represented by a number of frames describing objects or actions involved in the situation and their relationship to each other. A frame is a term, known to the skilled person, from artificial intelligence (AI), and represents a common pattern that occurs with different "actors" in fixed "roles."

The frame comprises slots, wherein the roles are represented by the slots and the slots are filled with the actors in a specific instance of such a frame. In particular, with reference to the present invention, entities 61 form the contents of the slot. In particular, the frame is a data-structure for representing a current or previous situation and is therefore a representation of a pattern. In general terms, a frame may be compared to a "class" in object oriented programming (OOP). In one embodiment, the pattern represented by the frame can represent a single situation.

Alternatively, the pattern represented by the frame may also be the essence of a large number of single situations. Therefore, the relations referring to the respective entities in the slots may carry various values. For example, the relations referring to the respective entities may carry a value indicating at least one of the probability and reliability of that relation. Further, another value can be set to characterize the importance of the respective relation in that situation. Also, these relations can be marked as causal or dependent relations, respectively. While the causal relations characterize a situation, the dependent relations may be considered as the deduction.

The frames, relations, and values for at least one of the situations the user has been involved with together with the current situation are stored in the first storage medium 15. In other words, the user's behavior is observed by the system 10 and stored as frames. This data may then be used by the context modeler 16 to model the context representation. This approach ensures a seamless integration of predefined and learned rules for evaluation purposes.

In this way, the context representation modeled by the context modeler 16 on the basis of the application manager 10 not only represents the application contents but also the observed user behavior including the current situation. It has been found that storing all situations 64 as situation representations involves the storage and handling of large amounts of data. To address this problem, the situation representation manager 13 is provided.

In accordance with an embodiment of the present invention, starting from an event, which may include a user interaction or a new interconnection, a subcontext 64 is built by the situation representation manager 13, which contains a cluster of interrelated entities 61, 62, 63' that are identified as being relevant for the user interaction or new interconnection.

The subcontext 64 may be identified in the following way: the subcontext is defined to initially contain those entities 61 which are directly affected by the event 60. When the event is defined by a manipulation of database resource contents, the two or more entities which are directly affected are those two or more entities which are being linked. These directly affected entities 61 are referred to herein as core entities of the subcontext.

According to an embodiment of the present invention, the situation representation manager 13 includes an activation value assignor 17 for assigning an activation value to the plurality of entities defined by the set of references that is the context. For the elements (that is the set of entities) in the initial subcontext 61, the activation value assignor 17 is arranged to further define and assign an activation value to the entities contained in the subcontext. It is noted that this further measure of activation is independent of the activation assigned to the context entities 61-63, and may be referred to as the subcontext activation.

The situation representation manager 13 determines the situation representation in a cyclic manner. In successive cycles, entities which are related to the subcontext and are part of, or directly related to, the active context are added to the subcontext 64. It is seen in FIG. 2, that in addition to those entities 62 directly related to the event 60, the situation representation manager 13 adds entity 63' to the subcontext 64 on the basis of its activation value AV. In contrast, the entity 63" is not added to the subcontext 64. Similarly, the determination to not include entity 63" in the subcontext is made on the basis of the activation value AV. Whether the entity is added or not to the subcontext 64 is determined by a determining means 18 which may include a data processor or the like. The condition for including an entity 63' into the subcontext 64 is that a weighted sum of the activation values derived from the sub context activation value and the active context activation value exceeds a predetermined threshold.

The derived activation value, that is the activation value that takes into account the activation value assigned to the context entities and the activation value assigned to the subcontext entities, is calculated as the sum of the base activations of the related entities, which are each weighted by a factor that is specific for the respective relation type. As a consequence of the condition applied by the determining means, which may be varied depending on the particular situation, an entity can be added to the subcontext for having a particular close connection to the subcontext or for having a particularly high relevance in the general context. In this way, it has been found that the most relevant entities are identified in a reliable and consistent manner. In a further embodiment, the subcontext activation values assigned to an entity newly added to the subcontext is dependent of the cycle in which the entity is added. In later cycles, new entities are assigned a lower activation. The determining means determines when the subcontext is complete when in a cycle no further entities are identified as exceeding the threshold required to be included into the subcontext. Once this is achieved, the subcontext is defined.

In one embodiment, the determining means 18 determines the situation representation 64 on the basis of the activation value AV with respect to a predetermined threshold. In a further embodiment, the application manager 10 includes a storage medium 15 for storing the situation representation 64, wherein the stored situation representation 64 is used to determine the behavior of the application in a future situation. As mentioned, in a further embodiment, the activation value AV for an entity 61-63 is derived in accordance with a degree to which the entity 61-63 is related to the situation's core entities 60. Further, an entity 62 directly related to the situation's core entities 60 is assigned an activation value AV having a higher relevance than an entity 63 indirectly related to the situation's core entities 60. Further, an entity 63' having a plurality of relations to a directly related entity 62 is assigned an activation value on the basis of the number of relations.

In a further embodiment, the determining means 18 is arranged to determine the subcontext 64 as being relevant for the event by a successive extension of a subset 60 that initially includes references to entities 61 directly affected by the situation's core entities 60. It is commented that the user is typically involved in an event. Further, the manipulation of database entities is considered as an event. A situation, on the other hand refers to the complete sub-context when finished. The subset, when completely defined, defines what the situation is. The core entities are the central part of the situation.

In a further embodiment, the determining means 18 is arranged to add entities 62, 63' to the initial subset 60 if they are related to at least one of the entities 61 of the initial subset 60 and on the basis of the activation value AV assigned to the entities 62, 63' to be added. The activation value AV is assigned to the entities 62, 63' to be added in accordance with the relations of the entities 62, 63' to be added to the entities 61-63 included in the context 65 and the activation values assigned to the related entities.

In a further embodiment, the activation value assignor assigns a subcontext activation attribute (also referred to as a value) to the entities included in the subcontext, which is dependent on the iteration in which an entity has been included in the subcontext. Further, the subcontext activation attribute for an entity included in the subcontext may be calculated by taking into account the number of subset entities to which the entity included in the subcontext is directly related. The activation value of an entity may be calculated as a sum of two components, wherein a first component is the sum of the activation values of directly related context entities, and a second component is the sum of the activation values of directly related sub context entities. In particular, the sum may be a weighted sum, wherein the activation value of each related entity is multiplied by a weighting factor depending on the kind or type of relation. As mentioned, the determining means determines the subset in a cyclical manner. Also, the storage medium 15 may be accessible by a context modeler for modeling a dynamic context representation on the basis of the stored situation representation 64.

In a typical relational database 22, a plurality of entities are stored in a plurality of tables in accordance with their entity type. In order for entities from different tables to be included in the context representation modeled by the context modeler 16, a further storage medium (not shown) may be provided to store a uniform representation of the entities from different tables. In a preferred embodiment, the further storage medium includes a semantic net representation which, in addition to providing a uniform representation, stores the relations between the different entity types. In a particular embodiment, the further storage medium is a semantic net server. If a semantic net server is used, the relations between the representations of the processes and actions are included.

A semantic net is a data structure made up of nodes and relations between those nodes. The nodes represent terms and they are embedded in abstraction hierarchy by means of the special relation type "is a". A semantic net is the common way of representing ontologies in a computer system. Representations of processes and actions are integrated in the semantic net structure as well as a general knowledge ontology. It is noted that an ontology is an explicit specification of a conceptualization. A conceptualization is an abstract, simplified view of the world it is desired to represent for some purpose. An ontology contains the vocabulary (terms or labels) and the definition of the concepts and their relationships for a given domain. An ontology is a representation that exists independent of any computer models or implementations.

In FIG. 1, a business application 20 is shown. In database resource 22, entities 61-63 are stored. In a first data repository 24, entity instances are stored. In a second data repository 26, entity classes are stored. The business application 20 further includes a recorded user behavior storage medium 28 for storing user behavior, a high level ontology storage medium 30 for storing a high level ontology, and other repositories 32 for storing other data. The database 22, the recorded user behavior storage medium 28, the high level ontology storage medium 39, and the other repositories 32 may exchange data with system 10 via communication links 27, 29, 31 and 33, respectively. Although in the embodiments described above, the entities are stored in database resource 22, the entities stored in the other repositories 28, 30, 32 may also be used either separately or in combination with each other and/or the database resource 22 by the application manager 10 to provide a situation representation.

In the example shown, only one database is shown. The invention is not limited in this respect since system 10 may be arranged to store situation representations and pattern representations from at least one database. For example, a plurality of databases may be influenced by the context representation modeled by context modeler 16.

Figure 3:
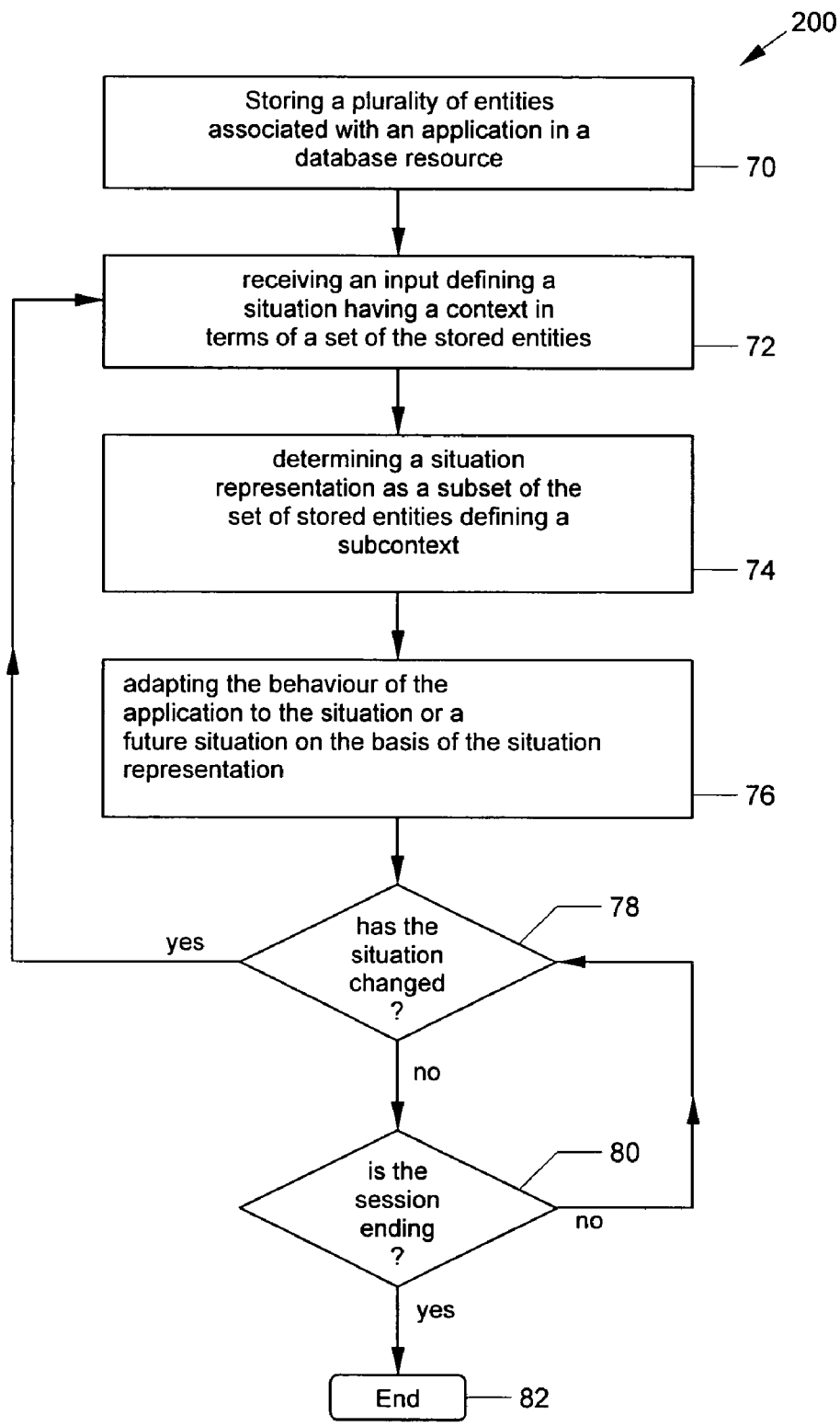
FIG. 3 shows a flow diagram incorporating a method of managing an application in accordance with an embodiment of the present invention.

FIG. 3 shows a flow diagram incorporating a method of managing an application in accordance with an embodiment of the present invention. A process 200 is shown including the steps of storing a plurality of entities associated with an application in a database resource (step 70), receiving an input defining an event having a context in terms of a set of the stored entities (step 72), determining a situation representation as a subset of the set of stored entities defining a subcontext (step 74) and adapting the behavior of the application to the situation or a future situation on the basis of the situation representation (step 76). Subsequently, the system determines whether the situation has changed (step 78). If it has, the process returns to step 72. If it has not, the system determines if the session is ending (step 80). If it is not, the process returns to step 78. If the session is ending, the process ends (step 82).

Consistent with an embodiment of the present invention, there is provided a method of managing an application 20. A plurality of entities 61 associated with the application 20 are stored in a database resource (step 70). An input 12 is received defining an event 60 in which a user is involved in the application 20 or an input 27 defining an event involving a manipulation of at least one entity 61-63 in the database resource 22. A context 65 is associated with the event 60 and is represented in the event by a set of references to a plurality of the entities 61-63 stored in the database resource (step 72). A situation representation 64 is determined in terms of a subset of the references to the plurality of entities 61, 62, 63' to define a subcontext (step 74). The determining step includes the step of identifying the subset of the references to the plurality of entities 61, 62, 63' which are relevant to the event 60. Then the behavior of the application 20 is adapted to the situation 60 or a future situation on the basis of the situation representation (step 76).

In a further embodiment, the determining step includes the step of assigning an activation value AV to the plurality of entities defined by the set of references 61-63, and determining the subset of entities 61, 62, 63' to be included in the situation representation 64 on the basis of the activation value AV. Further, the determining step determines the situation representation 64 on the basis of the activation value AV with respect to a predetermined threshold. The predetermined threshold may vary depending on factors including a preferred sensitivity or the type of application, for example, and may be set by a user or by the system. The method may include the additional step of storing the situation representation 64. The stored situation representation is used to determine the behavior of the application in a future situation. In this way, the context sensitivity is improved for future situations as context modeler 16 can learn from previously stored situation representations.

In another embodiment, the step of deriving the activation value for an entity 61-63 is determined in accordance with a degree to which the entity 61-63 is related to the event 60. In this way, entities 61-63 closely related to the situation are assigned a higher activation value than those less closely related to the situation 60. In particular, the step of assigning an activation value to an entity directly related to the situation is carried out so that the entity directly related to the situation has a higher relevance than an entity indirectly related to the situation. Further, the activation value may be assigned in accordance with the number of relations r. For example, the step of assigning an activation value AV to an entity 61, 62, 63' having a plurality of relations r to a directly related entity may be carried out on the basis of the number of relations r. In this way, those entities related by a higher number of relations are assigned a higher activation value than entities related by a lower number of relations. This further improves the relevance of the entities identified by the situation representation manager.

In another embodiment of the present invention, the step of determining the subcontext 64 as being relevant for the situation 60 is carried out by a successive extension of an initial subset 60 that initially includes references to entities 61 directly affected by the situation 60. Further, the determining step may include adding entities 62, 63' to the initial subset 60 if they are related to at least two of the entities of the initial subset 62' or on the basis of the activation value AV assigned to the entities 62, 63' to be added, wherein the activation value is assigned to the entities to be added in accordance with the relations of the entities to be added to the entities included in the context 65 and the activation values assigned to the related entities.

A further embodiment includes the step of assigning a subcontext activation attribute to the entities 61, 62, 63' included in the subcontext 64, which is dependent on the iteration in which an entity has been included in the subcontext. Further, the step of calculating the subcontext activation attribute for an entity included in the subcontext 64 is carried out by taking into account the number of subset entities to which the entity included in the subcontext is directly related. Yet further, the step of calculating the activation value of an entity is carried out as a sum of two components. A first component is the sum of the activation values of directly related context entities and a second component is the sum of the activation values of directly related sub context entities. Optionally, the sum is a weighted sum, wherein the activation value of each related entity is multiplied by a weighting factor depending on the kind or type of relation. In this way, context sensitivity is further improved. As mentioned previously, the determining step of determining the subset may be carried out in a cyclical manner.

In yet another embodiment, a step of accessing the storage medium by a context modeler is included to model a dynamic context representation on the basis of the stored situation representation. In this way, the context representation is improved. Further, the context modeler learns from the stored situation representations in order to improve the context modeled in subsequent situations.

According to another embodiment of the present invention, situation representations may be stored in the storage medium 15. Similarly, pattern representations may also be stored in the storage medium 15 or a separate storage medium (not shown).

The present invention has application to a user terminal comprising means operable to perform any of the methods described. The present invention has application to a program storage device readable by a processing apparatus, said device embodying a program of instructions executable by the processor to perform the steps of any one of the methods described.

The invention as described can be implemented in digital electronic circuitry, or in computer hardware, firmware, software, or in combination thereof. An apparatus according to the present invention can be implemented in a computer program product tangibly embodied in a machine readable storage device for execution by a programmable processor; and method steps of the invention can be performed by a programmable processor executing a program of instructions to perform functions of the invention by operating on input data and generating output. The invention can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Typically, a processor will receive instructions and data from a read-only memory and/or a random access memory. Typically, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example, semiconductor memory devices, such as EEPROM, and flash memory devices; magnetic disks such as internal hard disks and removable disks; magneto-optical disks; and CD-ROM disks. Any of the foregoing can be supplemented by, or incorporated in ASICs (application specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

While certain features and embodiments of the invention have been described, other embodiments of the invention will be apparent to those skilled in the art from consideration of the specification and practice of the embodiments of the invention disclosed herein. Further, the steps of the disclosed methods may be modified in any manner, including by reordering steps and/or inserting or deleting steps, without departing from the principles of the invention. It is intended, therefore, that the specification and examples be considered as exemplary only, with a true scope and spirit of the invention being indicated by the following claims and their full scope of equivalents.

What is claimed is:

1. An application management system comprising:
   a database resource for storing a plurality of entities associated with an application; and
   an application manager for modifying access by a user to the entities, based on a context of information presented to the user by the application, the application manager comprising:
   an input channel for receiving an input defining an event in which a user is involved in the application or an input defining an event involving a manipulation of at least one entity in the database resource,
   wherein a context is associated with the event and is represented in the event by a set of references to a plurality of the entities stored in the database resource; and
   a situation representation manager for determining a situation representation in terms of a subset of the set of references to the plurality of entities to define a subcontext, the subcontext containing entities that are directly affected by the event,
   wherein the situation representation manager is arranged to identify the subset of the references to the plurality of entities which are relevant to the event, the subset of references to the plurality of entities having an activation value which is calculated by the sum of the sum of the activation values of directly related context entities and the sum of the activation values of directly related subcontext entities, and
   wherein the application manager adapts access to each of the plurality of entities by the application in a situation or a future situation on the basis of the context of information presented to the user by the application, the subcontext identifying entities that are directly affected by the event, and the activation value, as determined by the situation representation manager.

2. The system according to claim 1, wherein the situation representation manager includes an activation value assignor for assigning the activation value to the plurality of entities defined by the subcontext and at least one of the set or subset of references, and a determining means for determining the subset of entities to be included in the situation representation on the basis of the activation value.

3. The system according to claim 2, wherein the determining means determines the situation representation on the basis of the activation value with respect to a predetermined threshold.

4. The system according to claim 3, wherein the application manager includes a storage medium for storing the situation representation, wherein the stored situation representation is used to determine the behavior of the application in a future situation.

5. The system according to claim 4, wherein the storage medium is accessible by a context modeler for modeling a dynamic context representation on the basis of the stored situation representation.

6. The system according to claim 2, wherein the determining means determines the subcontext as being relevant for the situation by a successive extension of an initial subset that initially includes references to entities directly affected by the event.

7. The system according to claim 6, wherein the determining means is arranged to add entities to the initial subset if they are related to at least two of the entities of the initial subset or on the basis of the activation value assigned to the entities to be added, wherein the activation value is assigned to the entities to be added in accordance with the relations of the entities to be added to the entities included in the context and the activation values assigned to the related entities.

8. The system according to claim 7, wherein the activation value assignor assigns a subcontext activation attribute to the entities included in the subcontext, which is dependent on the iteration in which an entity has been included in the subcontext.

9. The system according to claim 8, wherein the subcontext activation attribute for an entity included in the subcontext is calculated by taking into account the number of subset entities to which the entity included in the subcontext is directly related.

10. The system according to claim 2, wherein the determining means determines the subset in a cyclical manner.

11. The system according to claim 1, wherein the activation value for an entity is derived in accordance with a degree to which the entity is related to the situation.

12. The system according to claim 1, wherein an entity directly related to the situation is assigned an activation value having a higher relevance than an entity indirectly related to the event.

13. The system according to claim 1, wherein an entity having a plurality of relations to a directly related entity is assigned an activation value on the basis of the number of relations.

14. The system according to claim 1, wherein the sum of the sum of the activation values for the directly related context entities and the sum of the activation values for the directly related subcontext entities is a weighted sum, and wherein the activation value of each related entity is multiplied by a weighting factor depending on the kind or type of relation.

15. A method of managing an application comprising:
storing a plurality of entities associated with an application in a database resource;
receiving an input defining an event in which a user is involved in the application or an input defining an event involving a manipulation of at least one entity in the database resource,
wherein a context is associated with the event and is represented in the event by a set of references to a plurality of the entities stored in the database resource;
determining a situation representation in terms of a subset of the references to the plurality of entities to define a subcontext, the subcontext containing entities that are directly affected by the event,
wherein the subset of the references to the plurality of entities which are relevant to the event are identified, the subset of references to the plurality of entities having an activation value which is calculated by the sum of the sum of the activation values of directly related context entities and the sum of the activation values of directly related subcontext entities;
modifying access by a user to the entities, based on a context of information presented to the user by the application; and
adapting access to each of the plurality of entities by the application to a situation or a future situation on the basis of the context information previously associated with the entities in the situation representation, the subcontext identifying entities that are directly affected by the event, and the activation value.

16. The method according to claim 15, wherein determining a situation representation includes assigning the activation value to the plurality of entities defined by the subcontext and the set of references, and determining the subset of entities to be included in the situation representation on the basis of the activation value.

17. The method according to claim 16, wherein determining a situation representation further includes determining the situation representation on the basis of the activation value with respect to a predetermined threshold.

18. The method according to claim 16, further comprising:
assigning a subcontext activation attribute to the entities included in the subcontext, which is dependent on the iteration in which an entity has been included in the subcontext.

19. The method according to claim 16, further comprising:
calculating a subcontext activation attribute for an entity included in the subcontext by taking into account the number of subset entities to which the entity included in the subcontext is directly related.

20. The method according claim 15, further comprising:
storing the situation representation, wherein the stored situation representation is used to determine the behavior of the application in a future situation.

21. The method according to claim 15, further comprising:
deriving the activation value for an entity in accordance with a degree to which the entity is related to the event.

22. The method according to claim 15, further comprising:
assigning an activation value to an entity directly related to an event having a higher relevance than an entity indirectly related to the event.

23. The method according to claim 15, further comprising:
assigning an activation value to an entity having a plurality of relations to a directly related entity on the basis of the number of relations.

24. The method according to claim 15, further comprising:
determining the subcontext as being relevant for the event by a successive extension of an initial subset that initially includes references to entities directly affected by the event.

25. The method according to claim 24, further comprising:
adding entities to the initial subset if they are related to at least two of the entities of the initial subset and on the basis of an activation value assigned to the entities to be added, wherein the activation value is assigned to the entities to be added in accordance with the relations of the entities to be added to the entities included in the context and the activation values assigned to the related entities.

26. The method according to claim 15, wherein the sum of the sum of the activation values for the directly related context entities and the sum of the activation values for the directly related subcontext entities is a weighted sum, and wherein the activation value of each related entity is multiplied by a weighting factor depending on the kind or type of relation.

27. The method according to claim 15, further comprising:
determining the subset in a cyclical manner.

28. The method according to claim 15, further comprising:
accessing the storage medium by a context modeler to model a dynamic context representation on the basis of the stored situation representation.

29. A program storage device readable by a processing apparatus, the device embodying a program of instructions executable by the processor to perform a method, the method comprising:
storing a plurality of entities associated with an application in a database resource;
receiving an input defining an event in which a user is involved in the application or an input defining an event involving a manipulation of at least one entity in the database resource,
wherein a context is associated with the event and is represented in the event by a set of references to a plurality of the entities stored in the database resource;

determining a situation representation in terms of a subset of the references to the plurality of entities to define a subcontext, the subcontext containing entities that are directly affected by the event, wherein the subset of the references to the plurality of entities which are relevant to the event are identified, the subset of references to the plurality of entities having an activation value which is calculated by the sum of the sum of the activation values of directly related context entities and the sum of the activation values of directly related subcontext entities;

modifying access by a user to the entities, based on a context of information presented to the user by the application; and adapting access to each of the plurality of entities by the application to a situation or a future situation on the basis of the context information previously associated with the entities in the situation representation, the subcontext identifying entities that are directly affected by the event, and the activation value.

* * * * *